(12) United States Patent
Matsuba (10) Patent No.: US 11,137,043 B2
(45) Date of Patent: Oct. 5, 2021

(54) FRICTION MATERIAL COMPOSITION, AND FRICTION MATERIAL AND FRICTION MEMBER USING THE SAME

(71) Applicant: Hitachi Chemical Company, Ltd., Tokyo (JP)

(72) Inventor: Kazuaki Matsuba, Hino (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 16 days.

(21) Appl. No.: 15/571,688

(22) PCT Filed: Apr. 21, 2016

(86) PCT No.: PCT/JP2016/062647
§ 371 (c)(1),
(2) Date: Nov. 3, 2017

(87) PCT Pub. No.: WO2017/183155
PCT Pub. Date: Oct. 26, 2017

(65) Prior Publication Data
US 2018/0106321 A1    Apr. 19, 2018

(51) Int. Cl.
*F16D 69/02* (2006.01)
*C09K 3/14* (2006.01)
(Continued)

(52) U.S. Cl.
CPC ............ F16D 69/026 (2013.01); C01B 17/00 (2013.01); C01F 5/02 (2013.01); C01G 23/003 (2013.01);
(Continued)

(58) Field of Classification Search
CPC .................. F16D 69/026; F16D 69/028; F16D 2069/002; F16D 2200/0086; F16D 69/025;
(Continued)

(56) References Cited

U.S. PATENT DOCUMENTS 5,866,636 A * 2/1999 Nitto ..................... F16D 69/026
523/149
6,316,083 B1 * 11/2001 Kawabata ................. B32B 7/02
428/212
(Continued)

FOREIGN PATENT DOCUMENTS

CN    103881657 A    6/2014
EP    2980181 A1    2/2016
(Continued)

OTHER PUBLICATIONS

Englsih language translation of JP 2014-031469, pp. 1-9, Apr. 18, 2018.*
(Continued)

Primary Examiner — Alexander C Kollias
(74) Attorney, Agent, or Firm — Oliff PLC (57) ABSTRACT

A friction material composition imparts superior friction coefficient, abrasion resistance, aggressiveness against an opposite member, and brake noise preventive characteristics in high speed and high load braking to a friction material, although containing no copper, which can pollute rivers, lakes, the ocean, or other environments, or containing copper in an amount of at most 0.5 mass. Moreover, a friction material and a friction member each uses the friction material composition. The friction material composition includes a binder, an organic filler, an inorganic filler, and a fibrous base material, and the friction material composition contains copper in an amount of at most 0.5 mass % as an element or contains no copper. The binder contains silicone-rubber dispersed phenolic resin in an amount of 5 to 10 mass %. The inorganic filler contains zirconium oxide in an amount of 20 to 33 mass %.

13 Claims, 1 Drawing Sheet

(51) Int. Cl.
    *C01B 17/00*     (2006.01)
    *C01F 5/02*     (2006.01)
    *C01G 23/00*     (2006.01)
    *C01G 25/02*     (2006.01)
    *C08L 83/06*     (2006.01)
    *F16D 69/00*     (2006.01)

(52) U.S. Cl.
    CPC .............. *C01G 25/02* (2013.01); *C08L 83/06* (2013.01); *C09K 3/14* (2013.01); *F16D 69/028* (2013.01); *F16D 2069/002* (2013.01); *F16D 2200/0086* (2013.01)

(58) Field of Classification Search
    CPC ..... F16D 69/027; C01G 25/02; C01G 23/003; C01B 17/00; C01F 5/02; C08L 83/06; C09K 3/14; C09K 3/149
    See application file for complete search history.

(56) References Cited

U.S. PATENT DOCUMENTS

| | | | | |
|---|---|---|---|---|
| 2004/0262104 | A1* | 12/2004 | Ono | F16D 69/026 188/251 A |
| 2013/0220747 | A1* | 8/2013 | Kikudome | F16D 69/026 188/251 A |
| 2014/0174319 | A1 | 6/2014 | Yamamoto et al. | |
| 2014/0202805 | A1* | 7/2014 | Unno | F16D 69/026 188/251 A |
| 2016/0069408 | A1* | 3/2016 | Hattori | F16D 69/026 523/156 |
| 2016/0289442 | A1* | 10/2016 | Takada | C08L 61/14 |
| 2017/0219037 | A1* | 8/2017 | Yamamoto | F16D 69/026 |

FOREIGN PATENT DOCUMENTS

| | | |
|---|---|---|
| JP | 2002-266915 A | 9/2002 |
| JP | 2004-010790 A | 1/2004 |
| JP | 2012-197352 A | 10/2012 |
| JP | 2012-255052 A | 12/2012 |
| JP | 2014-031469 A | 2/2014 |
| JP | 2014-122314 A | 7/2014 |

OTHER PUBLICATIONS

Dec. 28, 2017 Decision on Patent issued in Japanese Application No. 2016-571437.

Jul. 19, 2016 Search Report issued in International Patent Application No. PCT/JP2016/062647.

* cited by examiner

FRICTION MATERIAL COMPOSITION, AND FRICTION MATERIAL AND FRICTION MEMBER USING THE SAME

TECHNICAL FIELD

The present invention relates to a friction material composition containing no asbestos, which is so called a "non-asbestos friction material composition", and also relates to a friction material and a friction member each using the friction material composition. Specifically, the present invention relates to a friction material composition that contains a small amount of copper and thereby has a low environmental load but has a superior friction coefficient and superior abrasion resistance. This friction material composition is suitable for a friction material for a disc brake pad, a brake lining, or other braking part, which is used to brake an automobile or other vehicle, in particular, a disc brake pad that receives a large load in braking. The present invention also relates to a friction material and a friction member each using the friction material composition.

BACKGROUND ART

Automobile braking devices conventionally use a disc brake or a drum brake, which respectively use a disc brake pad and a brake shoe as a friction member. Each of the friction members is constituted by attaching a friction material to a base member made of metal, such as steel.

Friction materials are classified into semi-metallic friction materials, which contain steel fibers as a fibrous base material at 30 mass % or greater and less than 60 mass % to the total amount of the friction material composition, low-steel friction materials, which contain steel fibers in a part of a fibrous base material at less than 30 mass % to the total amount of the friction material composition, and non-asbestos organic (NAO) materials, which scarcely contain steel-based fibers, such as steel fibers and stainless fibers, as a fibrous base material.

In response to the recent trend to prefer friction materials that cause less brake noise, friction members using a friction material of NAO material have widely been used (See Patent Document 1). This NAO material contains no steel fibers and no steel-based fibers and is formed of a fibrous base material of at least one of non-iron metal fibers, organic fibers, inorganic fibers, and other fibers, a binder such as thermosetting resin, and friction adjusting materials such as an organic filler, an inorganic filler, an inorganic abrasive, a lubricant, and metallic particles.

The friction material uses a friction material composition including a binder, a fibrous base material, an inorganic filler, an organic filler, and other components, and a friction material composition including the components singly or in combination is generally used to impart the above characteristics. Among others, copper in a fiber form or a powder form is added to a friction material because copper is effective to maintain a friction coefficient under braking condition at high temperatures or improve fade resistance, as well as improve abrasion resistance at high temperatures and strength of the friction material. However, it is suggested that abrasion powder generated in braking from the friction material containing copper also contains copper and pollutes rivers, lakes, the ocean, or other environments, and therefore, restrictions on use of friction materials containing copper have increased.

Under such considerations of the environment, a need for friction materials that contain no copper, which is a heavy metal, has increased, and development of a friction material of NAO material that contains no copper components, such as metal copper, copper alloys, and copper compounds, is started (see Patent Document 2).

Patent Document 1 is Japanese Unexamined Patent Application Publication No. 2004-010790. Patent Document 2 is Japanese Unexamined Patent Application Publication No. 2012-197352.

DISCLOSURE OF THE INVENTION

Problems Solved by the Invention

Whereas addition of a large amount of a copper component, in particular, copper fibers or copper particles, in the friction material of NAO material as an essential component can satisfy desired performance, removal of the copper fibers and the copper particles from the friction material of the NAO material generates various new problems that did not exist before.

One of the problems is decrease in the abrasion resistance and the friction coefficient in high speed and high load braking. Copper has a high thermal conductivity and thereby improves the heat radiating performance of a friction material. Thus, a friction material that contains no copper easily stores heat in high load, resulting in facilitating thermal decomposition of a phenolic resin and organic fibers, which respectively function as a binder and a fibrous base material. The decomposition of the phenolic resin or the organic fibers decreases the skeletal strength of the friction material and causes sudden abrasion and decrease in the friction coefficient.

The present inventors investigated these problems and found the following idea. That is, by using an inorganic filler having a high melting point and having hardness in a predetermined range in a friction material composition that contains no copper or contains copper in such a small amount as to be at most 0.5 mass %, abrasion resistance in high speed and high load braking is improved, and a friction coefficient is stabilized.

Friction materials generate kinetic energy by making friction with an opposite member, such as a disc rotor or a brake drum, and work to brake by converting the kinetic energy into thermal energy. The kinetic energy can be partially converted into vibration energy, which can generate brake noise. The above idea is effective for improving the abrasion resistance in high speed and high load braking and stabilizing the friction coefficient, but the brake noise should be further decreased.

In view of the above, an object of the present invention is to provide a friction material composition, which imparts superior friction coefficient, abrasion resistance, aggressiveness against an opposite member, and brake noise preventive characteristics in high speed and high load braking to a friction material, although containing no copper, which can pollute rivers, lakes, the ocean, or other environments, or containing copper in an amount of at most 0.5 mass %, and to provide a friction material and a friction member each using the friction material composition.

Means for Solving the Problems

The present inventors conducted various research with regard to binders to improve the friction material composition that uses a predetermined amount of the inorganic filler, which has a high melting point and hardness in a predetermined range. As a result, they found that brake noise can be decreased while stability of the abrasion resistance and the friction coefficient in high speed and high load braking is maintained, by using silicone-rubber dispersed phenolic resin as the binder.

Specifically, the friction material composition of the present invention based on this knowledge includes a binder, an organic filler, an inorganic filler, and a fibrous base material, and the friction material composition contains copper in an amount of at most 0.5 mass % as an element or contains no copper, and contains silicone-rubber dispersed phenolic resin in an amount of 5 to 10 mass % as the binder and zirconium oxide in an amount of 20 to 33 mass % as the inorganic filler.

The friction material composition of the present invention preferably also contains at least one of titanate in an amount of 10 to 30 mass %, magnesium oxide in an amount of 3 to 10 mass %, and metal sulfide in an amount of 3 to 8 mass %, as the inorganic filler.

The friction material of the present invention is molded by the friction material composition described above. Also, the friction member of the present invention is molded by using the friction material, which is molded by the friction material composition described above, and a back metal.

Effects of the Invention

The friction material composition of the present invention may be used in a friction material, such as for a disc brake pad or a brake lining for automobiles. The friction material composition of the present invention enables the friction material to generate abrasion powder that contains no copper or contains a very small amount of copper in braking and thereby have a low environmental load, as well as have superior friction coefficient, abrasion resistance, aggressiveness against an opposite member, and brake noise preventive characteristics in high speed and high load braking. Also, a friction material and a friction member each having the above characteristics are provided by using the friction material composition of the present invention.

EXPLANATION OF REFERENCE SYMBOLS

The reference symbol 1 denotes a brake pad as a friction member, 2 denotes a friction material, 22 denotes a slit, 23 denotes a chamfer, 3 denotes a back metal, and 4 denotes an adhesive layer.

Best Mode for Carrying Out the Invention

The following describes details of a friction material composition of the present invention and details of a friction material and a friction member each using the friction material composition.
Friction Material Composition The friction material composition of the present invention includes a binder, an organic filler, an inorganic filler, and a fibrous base material, and contains substantially no asbestos, and the friction material composition has a primary feature of containing copper in an amount of at most 0.5 mass % as an element or containing no copper. That is, the friction material composition will generate abrasion powder that scarcely pollutes rivers, lakes, the ocean, or other environments, in braking, because the friction material composition contains no copper or contains copper in such a small amount as to be at most 0.5 mass %.

Mere removing of copper from a conventional friction material composition leads a friction material to store heat in high loading, as described above. As a result, thermal decomposition of a phenolic resin and organic fibers, which respectively function as a binder and a fibrous base material, is facilitated. The decomposition of the phenolic resin or the organic fibers decreases the skeletal strength of the friction material and causes sudden abrasion and decrease in the friction coefficient.

In view of this, by using an inorganic filler that has a high melting point and hardness in a predetermined range in the friction material composition of the present invention, abrasion resistance in high speed and high load braking is improved, and a friction coefficient is stabilized.
Inorganic Filler The friction material composition of the present invention uses zirconium oxide as the inorganic filler. The inorganic filler preferably also contains at least one of titanate, magnesium oxide, and metal sulfide.
Zirconium Oxide Zirconium oxide is suitable for the skeleton of the friction material, since it is hard and has high heat resistance. Zirconium oxide that is contained in a suitable amount stabilizes a friction coefficient and imparts superior crack resistance and abrasion resistance. However, excessive addition of zirconium oxide increases aggressiveness against an opposite member, such as a disc rotor, and thus deteriorates abrasion resistance. Regarding this point, when zirconium oxide is contained in an amount of 20 to 33 mass %, abrasion resistance in high speed and high load braking is improved, and a friction coefficient is stabilized. The amount of zirconium oxide is preferably 23 to 33 mass %, more preferably 25 to 30 mass %.

By using zirconium oxide having particle sizes of 30 μm or less, the particles of zirconium oxide are more uniformly dispersed in the friction material, and deterioration of abrasion resistance is avoided. Zirconium oxide preferably has an average particle size of 20 μm or less, more preferably 15 μm or less. The particle sizes and the average particle size of zirconium oxide can be measured by using a method such as a laser diffraction particle size distribution measurement. For example, the particle sizes and the average particle size of zirconium oxide can be measured by a laser diffraction-scattering type particle size distribution analyzer, such as a LA-920 produced by Horiba Ltd.
Titanate The friction material composition of the present invention preferably also contains titanate in the inorganic filler. Titanate forms the skeleton in conjunction with zirconium oxide and reinforces zirconium oxide to strengthen the friction material as well as decrease aggressiveness against an opposite member, thereby stabilizing a friction coefficient. However, excessively added titanate decreases abrasion resistance at high temperatures and increases aggressiveness against an opposite member, thereby further decreasing abrasion resistance. Additionally, metal seizing tends to occur due to excessively added titanate. Regarding this point, the amount of titanate is preferably set at 10 to 30 mass % because the above effects are obtained while these undesirable influences are avoided. The amount of titanate is preferably 10 to 25 mass %, more preferably 15 to 25 mass %.

Titanate may include potassium titanate, lithium potassium titanate, and magnesium potassium titanate. Potassium titanate includes, for example, $K_2O.6TiO_2$ and $K_2O.8TiO_2$. Lithium potassium titanate may include, for example, titanates having compositions represented by $K_{0.3-0.7}Li_{0.27}Ti_{1.73}O_{3.8-3.95}$, which are produced by mixing a titanium source, a lithium source, and a potassium source together. Magnesium potassium titanate includes, for example, titanates having compositions represented by $K_{0.2-0.7}Mg_{0.4}Ti_{1.6}O_{3.7-3.95}$, which are produced by mixing a titanium source, a magnesium source, and a potassium source together. One of these titanates can be used alone or a combination of two or more of these titanates can be used. In particular, lithium potassium titanate and magnesium potassium titanate are preferable because they further improve abrasion resistance in high temperatures.

Titanate having a fibrous shape, a columnar shape, a plate shape, a particle shape, a scale-like shape, an amoebic shape, or a porous shape may be used, and one of these titanates can be used alone or a combination of two or more of these titanates can be used. In particular, titanate having a scale-like shape, a columnar shape, or a plate shape is preferable because they further improve abrasion resistance in high temperatures. The shape of titanate can be analyzed in observation using a scanning electron microscope (SEM), for example.

Moreover, titanate having an average particle size of 1 to 50 μm and having a specific surface area of 0.5 to 10 m²/g is preferable. Here, the average particle size is a median size, which is a size at 50% in volume distribution obtained by a laser diffraction method. The specific surface area can be calculated by a BET method using nitrogen gas as adsorption gas or other relevant method.

Magnesium Oxide

The friction material composition of the present invention preferably also contains magnesium oxide in the inorganic filler. Magnesium oxide is also hard and has high heat resistance, and therefore, magnesium oxide forms the skeleton in conjunction with zirconium oxide and reinforces zirconium oxide to improve crack resistance and abrasion resistance. However, excessively added magnesium oxide increases aggressiveness against an opposite member, such as a disc rotor, thereby decreasing abrasion resistance. Regarding this point, when the amount of magnesium oxide is 3 to 10 mass %, the effect for reinforcing zirconium oxide is effectively obtained. The amount of magnesium oxide is preferably 3 to 8 mass %, more preferably 4 to 7 mass %.

Metal Sulfide

The friction material composition of the present invention preferably also contains metal sulfide in the inorganic filler. Although metal sulfide stabilizes friction coefficient in high speed and high load braking, excessively added metal sulfide decreases friction coefficient. Regarding this point, when the amount of metal sulfide is 3 to 8 mass %, friction coefficient in high speed and high load braking is stabilized, and abrasion of the friction material is reduced. Metal sulfide of the present invention includes antimony trisulfide, tin sulfide, tin disulfide, molybdenum disulfide, iron sulfide, iron disulfide, bismuth sulfide, zinc sulfide, tungsten disulfide, and one of these metal sulfides can be used alone or a combination of two or more of these metal sulfides can be used. The amount of metal sulfide is preferably 3 to 7 mass %, more preferably 3 to 6 mass %.

Other Inorganic Filler

The friction material composition of the present invention may include an inorganic filler that contains a combination of components other than zirconium oxide, titanate, magnesium oxide, and metal sulfides. Any components that are commonly used in a friction material can be used for the inorganic filler. For example, calcium hydroxide, calcium oxide, sodium carbonate, calcium carbonate, magnesium carbonate, barium sulfate, dolomite, coke, iron oxide, vermiculite, calcium sulfate, graphite, mica, talc, clay, zeolite, zirconium silicate, mullite, chromite, titanium oxide, silica, or activated alumina such as α-alumina or γ-alumina, may be used. One of these substances can be used alone or a combination of two or more of these substances can be used.

Binder

The binder binds the organic filler, the inorganic filler, and the fibrous base material in the friction material composition and imparts strength to the friction material made of the friction material composition. The friction material composition of the present invention includes the inorganic filler described above, whereby abrasion resistance in high speed and high load braking is improved, and friction coefficient is stabilized, while aggressiveness against an opposite member is decreased. Furthermore, by using a silicone-rubber dispersed phenolic resin as the binder, generation of brake noise is inhibited in braking, while the above effects are obtained.

Silicone-Rubber Dispersed Phenolic Resin

The silicone-rubber dispersed phenolic resin is very elastic and has high heat resistance, and thus, it hardly decomposes in high speed and high load braking and effectively absorbs vibration energy, which is generated by conversion of a part of thermal energy, thereby inhibiting generation of brake noise. Naturally, when the silicone-rubber dispersed phenolic resin is added in a large amount, the amounts of the inorganic filler, the organic filler, and the fibrous base material are decreased correspondingly. Regarding this point, when the binder contains the silicone-rubber dispersed phenolic resin in an amount of 5 to 10 mass %, generation of brake noise is effectively inhibited. The amount of the silicone-rubber dispersed phenolic resin is preferably 5 to 9 mass %, more preferably 6 to 9 mass %.

The silicone-rubber dispersed phenolic resin preferably contains silicone rubber in an amount of 3 to 10 mass %. Additionally, the silicone rubber, which is dispersed in the phenolic resin, preferably has particle sizes of 50 μm or less, more preferably 30 μm or less.

Organic Filler

The organic filler is contained as a friction adjusting material to improve sound vibration performance, which represents tendency to inhibit generation of brake noise and vibration in braking, and abrasion resistance, of the friction material. The organic filler that is contained in the friction material composition of the present invention may be any material that can exhibit the above functions, and cashew dust and rubber component, which are normally used as organic fillers, may be used. The cashew dust can be that which is obtained by crushing a cured material of cashew nut shell oil and which are normally used in a friction material. The rubber component includes, for example, natural rubber, acrylic rubber, isoprene rubber, polybutadiene rubber (BR), nitrile-butadiene rubber (NBR), and styrene-butadiene rubber (SBR). One of these types of rubber can be used alone or a combination of two or more of these types of rubber can be used. The cashew dust and the rubber component may be used together. Cashew dust covered with the rubber component may be used. The organic filler preferably contains both the cashew dust and the rubber component from the viewpoint of the sound vibration performance.

The amount of the organic filler in the friction material composition of the present invention is preferably 1 to 20 mass %, more preferably 1 to 15 mass %, and even more preferably 5 to 15 mass %. The amount of the organic filler is set to be in the range of 1 to 20 mass %, whereby increase in the elastic modulus of the friction material and deterioration of the sound vibration performance, which may cause generation of brake noise, are avoided, and decrease in the heat resistance and decrease in the strength due to heat history are also avoided. In a case of using the cashew dust and the rubber component together, the mass ratio of the cashew dust to the rubber component is preferably in the range of 0.2 to 10, more preferably 0.3 to 5.

Fibrous Base Material

The fibrous base material reinforces the friction material.

The friction material composition of the present invention may use inorganic fibers, metal fibers, organic fibers, carbon-based fibers, or other fibers, which are normally used as a fibrous base material. One of these fibers can be used alone or a combination of two or more of these fibers can be used. Here, the fibrous base material does not include titanate having a fiber shape, which is described above.

The inorganic fibers may be ceramic fibers, biodegradable ceramic fibers, mineral fibers, glass fibers, silicate fibers, or other fibers, and one of these fibers can be used alone or a combination of two or more of these fibers can be used.

The mineral fibers are artificial inorganic fibers, which are obtained by melt spinning a raw material of which a primary component is blast furnace slag such as of slag wool, basalt such as of basalt fibers, other natural rock, or other mineral substance. The mineral fibers more preferably made from a natural mineral containing aluminum element. Specifically, mineral fibers containing one or any combination of $SiO_2$, $Al_2O_3$, CaO, MgO, FeO, $Na_2O$, and other substances, may be used, and mineral fibers containing aluminum element are preferably used among these mineral fibers. As the mineral fibers in the friction material composition have a longer average fiber length, bonding strength between each component in the friction material composition and the mineral fibers is decreased. Thus, the average fiber length of the mineral fibers is preferably 500 μm or less, more preferably 100 to 400 μm. Here, the average fiber length represents an average value of the lengths of all contained fibers. For example, an average fiber length of 200 μm is an average of the fiber lengths, which are measured by an optical microscope, of 50 mineral fibers that are freely selected from among mineral fibers to be used as a raw material of the friction material composition.

The mineral fibers of the present invention are preferably biodegradable. These biodegradable mineral fibers are those which can be partially decomposed and be discharged from a human body in a short time even if taken into the human body. Specifically, the biodegradable mineral fibers satisfy that the total amount of alkali metal oxides and alkaline earth metal oxides, that is, the total amount of oxides of sodium, potassium, calcium, magnesium, and barium, is 18 mass % or greater in the chemical composition. The biodegradable mineral fibers also satisfy that the mass half-life of the fibers of 20 μm or greater is within 40 days in a respiratory short-term biodurability test, or that there is no evidence of excessive carcinogenicity in an intraperitoneal test, or that there is no related pathogenicity or tumor occurrence in a long-term respiration test, as specified in Note Q (exclusion from application of carcinogenicity) of EU Directive 97/69/EC. Such biodegradable mineral fibers include $SiO_2$—$Al_2O_3$—CaO—MgO—FeO—$Na_2O$-based fibers and fibers containing any combination of $SiO_2$, $Al_2O_3$, CaO, MgO, FeO, $Na_2O$, and other substances. Specifically, commercially available fibers such as of the Roxul series produced by Lapinus Fibers B.V. may be used. The fibers of the Roxul series contain $SiO_2$, $Al_2O_3$, CaO, MgO, FeO, $Na_2O$, and other substances.

Although metal fibers other than metal fibers made of copper or copper alloys may be used from the viewpoint of increase in friction coefficient and crack resistance, these metal fibers should be contained at 5 mass % or less to improve abrasion resistance and to inhibit metal seizing. It is preferable to contain no such metal fibers, that is, contain 0 mass % of such metal fibers, because abrasion resistance is deteriorated, and metal seizing easily occurs considering the effect for improving friction coefficient.

The metal fibers other than metal fibers made of copper or copper alloys include, for example, fibers of one of single metals or alloys of aluminum, iron, zinc, tin, titanium, nickel, magnesium, silicon, and fibers made primarily of metal such as cast iron. One of these fibers can be used alone or a combination of two or more of these fibers can be used.

The organic fibers may be aramid fibers, cellulose fibers, PBO fibers, acrylic fibers, phenolic resin fibers having a crosslinked structure, or other fibers, and one of these fibers can be used alone or a combination of two or more of these fibers can be used. The aramid fibers are preferably used from the view point of abrasion resistance.

The carbon-based fibers may be flameproof fibers, pitch-based carbon fibers, PAN-based carbon fibers, activated carbon fibers, or other fibers, and one of these fibers can be used alone or a combination of two or more of these fibers can be used.

The amount of the fibrous base material in the friction material composition of the present invention is preferably 5 to 40 mass %, more preferably 5 to 20 mass %, and even more preferably 5 to 18 mass %. The amount of the fibrous base material is set to be in the range of 5 to 40 mass %, whereby a porosity suitable for a friction material is obtained, thereby preventing brake noise, and an appropriate material strength and high abrasion resistance are obtained as well as the formability being improved.

It is noted that a large amount of iron based fibers increase aggressiveness against an opposite member, and therefore, 5 mass % or less of or no iron based fibers are preferably contained in the friction material composition of the present invention.

Other Materials

The friction material composition of the present invention may include a material in addition to the binder, the organic filler, the inorganic filler, and the fibrous base material, as necessary. For example, an organic additive of fluorine based polymer, such as polytetrafluoroethylene (PTFE), may be contained.

Friction Material and Friction Member

The present invention provides a friction material and a friction member each using the friction material composition described above.

By molding the friction material composition of the present invention, the friction material composition of the present invention can be used as a friction material such as for a disc brake pad or a brake lining for automobiles or other vehicles. The friction material of the present invention has superior stability of friction coefficient and superior abrasion resistance under high speed and high load and is thereby suitable for a disc brake pad that receives a large load in braking.

Furthermore, by forming the friction material so as to be a friction surface, a friction member having the friction surface is obtained. The structure of the friction member that is formed by using the friction material is exemplified below.
(1) A structure using only the friction material.
(2) A structure using a back metal and a friction material that is made of the friction material composition of the present invention as a friction surface on the back metal.
(3) A structure of interposing both a primer layer, which modifies a surface of the back metal to improve an effect for adhering the back metal, and an adhesive layer, which adheres the back metal and the friction material, between the back metal and the friction material of the structure (2).

A back metal is normally used in a friction member to improve the mechanical strength of the friction member. The material of the back metal may be metal, fiber reinforced plastic, or of another type, and specifically, the material may be iron, stainless steel, inorganic fiber-reinforced plastic, carbon fiber-reinforced plastic, or of another type. The primer layer and the adhesive layer may be those normally used in a friction member, such as a brake shoe.

The friction material of the present invention can be produced by a commonly used method and is produced by molding the friction material composition of the present invention, preferably by hot press molding. Specifically, the friction material composition of the present invention may be uniformly mixed by a mixer, such as a Loedige mixer, a pressurizing kneader, or an Eirich mixer ("Eirich" is a registered trademark). The mixture may be premolded in a mold, and the premold may be further molded at a molding temperature of 130 to 160° C. and at a molding pressure of 20 to 50 MPa for a molding time of 2 to 10 minutes. The molded body may be heat treated at a temperature of 150 to 250° C. for 2 to 10 hours. Thus, the friction material is produced. The friction material may be produced by further performing coating, a scorch treatment, or a polishing treatment as necessary.

The friction material composition of the present invention has superior stability of friction coefficient and superior abrasion resistance under high speed and high load and is thereby effectively used as a top finishing material of, for example, a disc brake pad or a brake lining. The friction material composition of the present invention can also be used by being molded into an underlying material of a friction member.

The top finishing material is a friction material to be used as a friction surface of a friction member. The underlying material is a layer that is interposed between a friction material, which is to be used as a friction surface of a friction member, and a back metal and that improves shear strength and crack resistance in proximity to adhered portions of the friction material and the back metal.

Figure 1A:
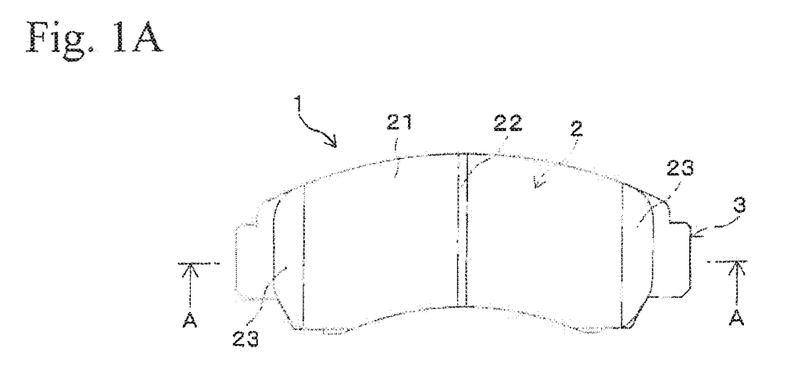
FIG. 1A is a top view showing an example of a brake pad as a friction member according to an embodiment of the present invention.
Figure 1B:
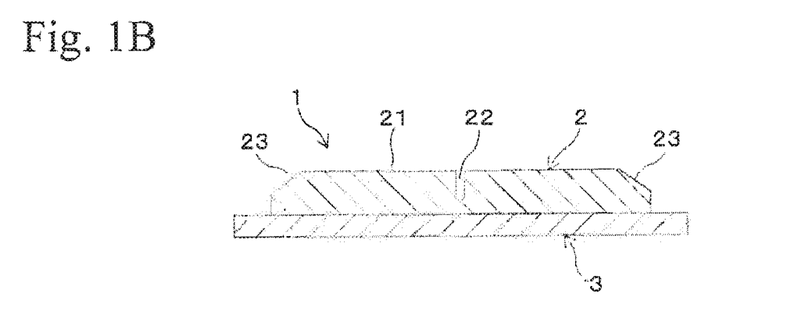
FIGS. 1B and 1C are sectional views taken along an A-A line in FIG. 1A when an adhesive layer with a given thickness is not provided and when an adhesive layer with a given thickness is provided, respectively.
Figure 1C:
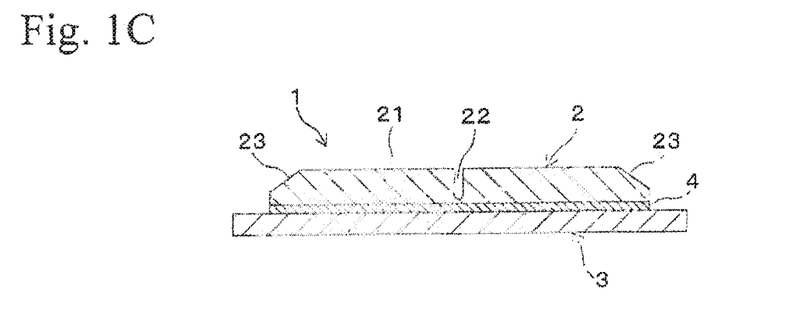

FIG. 1 shows a brake pad 1 of an automobile disc brake, and the brake pad 1 is a friction member relating to an embodiment of the present invention. The brake pad 1 is formed by attaching a plate molded friction material 2 on one side of a plate-shaped back metal 3, which is made of cast iron. The friction material 2 has a surface 21 as a friction surface to be pressingly brought into contact with a disc rotor (not shown), which is an opposite member. The whole of the brake pad 1 is formed into an arc shape along the circumferential direction of the disc rotor. A slit 22 extending in a radial direction is formed at a center part in the circumferential direction on the surface 21 of the friction material 2, and a chamfer 23 is formed at each end part in the circumferential direction on the surface 21 of the friction material 2.

The friction material 2 is obtained by molding the friction material composition described above, and the brake pad 1 has, for example, the above structure (2) or (3) of the friction member. FIG. 1B is a sectional view showing the structure (2). FIG. 1C is a sectional view showing the structure (3), and the reference symbol 4 represents an adhesive layer that is provided at a predetermined thickness between the friction material 2 and the back metal 3.

The brake pad 1 is produced as follows; that is, a friction material composition is obtained as a raw material by preparing the above various kinds of materials and mixing them together, the raw material is premolded into the friction material 2, the premold is attached on the back metal 3 and is hot press molded in conjunction with the back metal 3, the molded body is subjected to necessary treatments such as a heat treatment, coating, a scorch treatment, and a polishing treatment, and then the slit 22 and the chamfer 23 are formed on the friction material 2.

Examples

The following describes further details of the present invention by referring to Examples. However, the present invention is not limited to the Examples.

Examples were evaluated by the methods shown in Table 1 according to the evaluation criteria shown in Table 1. Moreover, brake noise of 70 dB or more and 1,000 to 15,000 Hz was measured according to SAE J2521, and noise performance was evaluated by the rate of occurrence of the brake noise.

TABLE 1

|  | No. | Section | Initial speed (km/h) | Final speed (km/h) | Breaking deceleration (m/s$^2$) | Rotor temperature befor breaking (° C.) | Interval between breakings (sec) | Number of times of breakings |
|---|---|---|---|---|---|---|---|---|
| Test condition | 1 | Lining bedding | 60 | 0 | 3.1 | 120 | — | 200 |
|  | 2 | 1st effect | 40 | 5 | 1 | 100 | — | Once each |
|  |  |  |  |  | 2 |  |  |  |
|  |  |  |  |  | 3 |  |  |  |
|  |  |  |  |  | 4 |  |  |  |
|  |  |  |  |  | 5 |  |  |  |
|  |  |  |  |  | 6 |  |  |  |
|  |  |  |  |  | 7 |  |  |  |
|  |  |  |  |  | 8 |  |  |  |
|  | 3 | 2nd effect | 160 | 130 | 1 | 100 | — | Once each |
|  |  |  |  |  | 2 |  |  |  |
|  |  |  |  |  | 4 |  |  |  |
|  |  |  |  |  | 5 |  |  |  |
|  |  |  |  |  | 6 |  |  |  |

TABLE 1-continued

| | | | | 7 8 | | | |
|---|---|---|---|---|---|---|---|
| 4 | Fade | 200 | 80 | 8 | 100 (first time only) | 60 | 15 |

| Evaluation item | | | Evaluation criteria | |
|---|---|---|---|---|
| Evaluation method | Friction coefficient in high loading | Minimun μ on fade section | A | 0.30 or greater |
| | | | B | 0.25 or greater and less than 0.30 |
| | | | C | 0.20 or greater and less than 0.25 |
| | | | D | 0.15 or greater and less than 0.20 |
| | | | E | less than 0.15 |
| | Abrasion amount of pad | Abrasion amount of pad in test | A | less than 1.5 mm |
| | | | B | 1.5 mm or greater and less than 3.5 mm |
| | | | C | 3.5 mm or greater and less than 5 mm |
| | | | D | 5 mm or greater and less than 8 mm |
| | | | E | 8 mm or greater |
| | Abrasion amount of rotor | Abrasion amount of rotor in test | A | less than 10 μm |
| | | | B | 10 mm or greater and less than 15 mm |
| | | | C | 15 mm or greater and less than 25 mm |
| | | | D | 25 mm or greater and less than 40 mm |
| | | | E | 40 mm or greater |

These tests were performed by using a dynamometer at an inertia of 7 kgf·m·sec$^2$. Additionally, these tests were performed by also using a ventilated disc rotor (produced by Kiriu Corporation, Material: FC190) and an ordinary colette caliper of the pin slide type.

Examples 1 to 11 and Comparative Examples 1 to 5

Friction material compositions of Examples and Comparative Examples were produced by mixing materials at mixing ratios shown in Table 2. The unit of the mixing amount of each component shown in Table 2 is mass % in the friction material composition. Each of the friction material compositions was mixed by a Loedige mixer (produced by Matsubo Corporation, product name: Loedige mixer M20), and the mixtures were premolded by a molding press produced by Oji Machine Co., Ltd. The premolds were hot press molded at a molding temperature of 150° C. and at a molding pressure of 30 MPa for a molding time of 5 minutes by a molding press produced by Sanki Seiko Co., Ltd. in conjunction with corresponding steel back metals. The molded bodies were heat treated at 200° C. for 4.5 hours, polished by a rotary polisher, and then scorch treated at 500° C., whereby disc brake pads each having a friction material, which had a thickness of 11 mm and a projection area of 52 cm$^2$, were produced. These disc brake pads were evaluated as described above, and the results are shown in Tables 2 and 3.

Each of the materials used in Examples and Comparative Examples is as follows.

Titanate 1: trade name: "Terracess TF-S", produced by Otsuka Chemical Co., Ltd. component: potassium titanate, shape: scale-like shape, median size: 7 μm, specific surface area: 3.5 m$^2$/g Titanate 2: trade name: "Terracess L", produced by Otsuka Chemical Co., Ltd. component: lithium potassium titanate, shape: scale-like shape, median size: 25 μm, specific surface area: 0.6 m$^2$/g Zirconium oxide "A": trade name: "BR-12QZ", produced by Daiichi Kigenso Kagaku Kogyo Co., Ltd.

average particle size: 8.5 μm, maximum particle size: 15 μm

Zirconium oxide "B": trade name: "BR-3QZ", produced by Daiichi Kigenso Kagaku Kogyo Co., Ltd.

average particle size: 2.0 μm, maximum particle size: 45 μm

TABLE 2

| | | Example | | | | | | | |
|---|---|---|---|---|---|---|---|---|---|
| | | 1 | 2 | 3 | 4 | 5 | 6 | 7 | 8 |
| Binder | Silicone-rubber dispersed phenolic resin | 5 | 7.5 | 10 | 8 | 8 | 8 | 8 | 8 |
| | Unmodified phenolic resin | 5 | 2.5 | 0 | 0 | 0 | 0 | 0 | 0 |
| Organic filler | Cashew dust | 4 | 4 | 4 | 4 | 4 | 4 | 4 | 4 |
| | SBR powder | 1 | 1 | 1 | 1 | 1 | 1 | 1 | 1 |
| Inorganic filler | Titanate 1 | 25 | 25 | 25 | 10 | 0 | 10 | 10 | 30 |
| | Titanate 2 | 0 | 0 | 0 | 15 | 25 | 10 | 0 | 0 |
| | Tin sulfide | 4 | 4 | 4 | 4 | 4 | 4 | 4 | 4 |
| | Zinc sulfide | 0 | 0 | 0 | 0 | 0 | 0 | 0 | 0 |
| | Barium sulfate | 9 | 11 | 11 | 18 | 3 | 13 | 31 | 7 |
| | Graphite | 4 | 4 | 4 | 4 | 4 | 4 | 4 | 4 |
| | Calcium hydroxide | 2 | 2 | 2 | 2 | 2 | 2 | 2 | 2 |
| | Magnesium oxide | 6 | 6 | 6 | 6 | 6 | 6 | 3 | 10 |
| | Zirconium oxide "A" | 25 | 25 | 25 | 20 | 33 | 0 | 25 | 20 |
| | Zirconium oxide "B" | 0 | 0 | 0 | 0 | 0 | 30 | 0 | 0 |
| Fibrous base material | Aramid fibers | 3 | 3 | 3 | 3 | 3 | 3 | 3 | 3 |
| | Iron-based fibers | 0 | 0 | 0 | 0 | 0 | 0 | 0 | 0 |
| | Copper fibers | 0 | 0 | 0 | 0 | 0 | 0 | 0 | 0 |
| | Mineral fibers | 5 | 5 | 5 | 5 | 5 | 5 | 5 | 5 |
| Other | Fluorine based polymer | 2 | 0 | 0 | 0 | 2 | 0 | 0 | 2 |

TABLE 2-continued

|  |  | Example | | | | | | | |
|---|---|---|---|---|---|---|---|---|---|
|  |  | 1 | 2 | 3 | 4 | 5 | 6 | 7 | 8 |
| Evaluated result | Fade performance | A | A | B | C | A | A | A | B |
|  | Pad abrasion | A | A | B | A | B | B | C | B |
|  | Rotor abrasion | A | B | A | A | C | B | B | B |
|  | Rate of occurrence of break noise (%) | 0 | 0 | 0 | 0 | 0 | 0 | 0 | 0 |

TABLE 3

|  |  | Example | | | Comparative Example | | | | |
|---|---|---|---|---|---|---|---|---|---|
|  |  | 9 | 10 | 11 | 1 | 2 | 3 | 4 | 5 |
| Binder | Silicone-rubber dispersed phenolic resin | 8 | 8 | 8 | 4 | 12 | 0 | 8 | 8 |
|  | Unmodified phenolic resin | 0 | 0 | 0 | 7 | 0 | 10 | 0 | 0 |
| Organic filler | Cashew dust | 4 | 4 | 4 | 4 | 4 | 4 | 4 | 4 |
|  | SBR powder | 1 | 1 | 1 | 1 | 1 | 1 | 1 | 1 |
| Inorganic filler | Titanate 1 | 25 | 25 | 25 | 25 | 25 | 25 | 25 | 25 |
|  | Titanate 2 | 0 | 0 | 0 | 0 | 0 | 0 | 0 | 0 |
|  | Tin sulfide | 4 | 0 | 0 | 4 | 4 | 4 | 4 | 4 |
|  | Zinc sulfide | 4 | 4 | 4 | 0 | 0 | 0 | 0 | 0 |
|  | Barium sulfate | 9 | 11 | 10.5 | 8 | 7 | 9 | 20 | 3 |
|  | Graphite | 4 | 4 | 4 | 4 | 4 | 4 | 4 | 4 |
|  | Calcium hydroxide | 2 | 2 | 2 | 4 | 4 | 4 | 4 | 4 |
|  | Magnesium oxide | 6 | 6 | 6 | 6 | 6 | 6 | 6 | 6 |
|  | Zirconium oxide "A" | 25 | 25 | 0 | 25 | 25 | 25 | 18 | 35 |
|  | Zirconium oxide "B" | 0 | 0 | 25 | 0 | 0 | 0 | 0 | 0 |
| Fibrous base material | Aramid fibers | 3 | 3 | 3 | 3 | 3 | 3 | 3 | 3 |
|  | Iron-based fibers | 0 | 0 | 2.5 | 0 | 0 | 0 | 0 | 0 |
|  | Copper fibers | 0 | 0 | 0 | 0 | 0 | 0 | 0 | 0 |
|  | Mineral fibers | 5 | 5 | 5 | 5 | 5 | 5 | 3 | 3 |
| Other | Fluorine based polymer | 0 | 2 | 0 | 0 | 0 | 0 | 0 | 0 |
| Evaluated result | Fade performance | A | B | A | A | D | A | E | A |
|  | Pad abrasion | B | B | B | B | B | A | A | B |
|  | Rotor abrasion | C | B | B | A | B | A | A | D |
|  | Rate of occurrence of break noise (%) | 0 | 0 | 0 | 4 | 0 | 9 | 0 | 3 |

As shown in Tables 2 and 3, Examples 1 to 11, which contain the silicone-rubber dispersed phenolic resin in an amount of 5 to 10 mass % and zirconium oxide in an amount of 20 to 33 mass %, exhibited a target level or higher (C or higher) with respect to the pad abrasion and the rotor abrasion while maintaining fade μ, and did not generate brake noise. In contrast, in Comparative Examples 1 to 5, the μ level was decreased, the pad abrasion and the rotor abrasion were increased, or the rate of the occurrence of the brake noise was increased, because the amounts of zirconium oxide and silicone-rubber dispersed phenolic resin deviated from the claimed range of the present invention, and as a result, not all of these characteristics satisfied the target level.

INDUSTRIAL APPLICABILITY

The friction material composition of the present invention enables a friction material to generate abrasion powder that contains no copper or contains a very small amount of copper in braking and thereby pollutes the environment less, as well as has superior friction coefficient, abrasion resistance, aggressiveness against an opposite member, and brake noise preventive characteristics in high speed and high load braking. Accordingly, the friction material composition of the present invention is useful for a friction material and a friction member, such as for a brake pad or a brake lining for automobiles.

The invention claimed is:

1. A friction material composition comprising a binder, an organic filler, an inorganic filler, and a fibrous base material,
    wherein the friction material composition contains copper in an amount of at most 0.5 mass % as an element or contains no copper, and contains metal fiber made from a metal other than copper or a copper alloy in an amount of from 0 mass % to not more than 5 mass %;
    the binder contains silicone-rubber dispersed phenolic resin in an amount of 5 to 10 mass %, based on the friction material composition;
    the inorganic filler contains zirconium oxide in an amount of 20 to 25 mass %, based on the friction material composition;
    the inorganic filler contains titanate in an amount of 10 to 30 mass %, based on the friction material composition;
    the inorganic filler contains magnesium oxide in an amount of 3 to 8 mass %, based on the friction material composition;
    the silicone-rubber dispersed phenolic resin contains silicone rubber in an amount of 3 to 10 mass %, based on the silicone-rubber dispersed phenolic resin; and
    the silicone rubber that is dispersed in the silicone-rubber dispersed phenolic resin has a particle size of 50 μm or less.

2. The friction material composition according to claim 1, wherein the inorganic filler contains metal sulfide in an amount of 3 to 8 mass %, based on the friction material composition.

3. The friction material composition according to claim 1, wherein, the silicone rubber that is dispersed in the silicone-rubber dispersed phenolic resin has a particle size of 30 μm or less.

4. The friction material composition according to claim 1, wherein the amount of the silicone-rubber dispersed phenolic resin is 5 to 9 mass %, based on the friction material composition.

5. The friction material composition according to claim 1, wherein the amount of the silicone-rubber dispersed phenolic resin is 6 to 9 mass %, based on the friction material composition.

6. The friction material composition according to claim 1, wherein the zirconium oxide has a particle size of 30 μm or less and an average particle size of 20 μm or less.

7. The friction material composition according to claim 1, wherein no copper is present.

8. The friction material composition according to claim 1, wherein the inorganic filler contains zirconium oxide in an amount of more than 20 and not more than 25 mass %, based on the friction material composition.

9. The friction material composition according to claim 1, wherein the inorganic filler contains zirnconium oxide in an amount, of 23 to 25 mass %, based on the friction material composition.

10. The friction material composition according to claim 1, wherein the metal fiber is present in an amount of from 0 mass % to 2.5 mass %, based on the friction material composition.

11. The friction material composition according to claim 1, wherein no metal fiber made from a metal other than copper or a copper alloy is present.

12. A friction material molded by the friction material composition according to claim 1.

13. A friction member molded by using a friction material, which is molded by the friction material composition according to claim 1, and a back metal.

* * * * *